United States Patent Office 3,215,681
Patented Nov. 2, 1965

3,215,681
POLYMERIZATION OF ETHYLENICALLY UNSATURATED HYDROCARBON IN THE PRESENCE OF AN ALUMINUM TRIHALIDE, AN AROMATIC MERCURY HYDROCARBON, A TRANSITION METAL HALIDE, AND A LIQUID HALOGENATED HYDROCARBON POLYMERIZATION MEDIUM
Peter Volans, Llanrumney, Cardiff, Wales, England, assignor to Monsanto Chemicals Limited, London, England, a British company
No Drawing. Filed Oct. 22, 1962, Ser. No. 232,248
Claims priority, application Great Britain, Nov. 4, 1958, 35,332/58
11 Claims. (Cl. 260—94.9)

This invention is a continuation in part of that described in copending application S.N. 847,695, filed October 21, 1959, and now abandoned and relates to the production of polymers, including homopolymers and copolymers of ethylenically unsaturated hydrocarbons, and more particularly those of ethylene and propylene.

In recent years, the polymerization of ethylenically unsaturated hydrocarbons to solid plastic materials has received much attention. This is especially so as to the polymerization of ethylene. The precise character of a polyethylene depends very much upon the conditions under which the ethylene is polymerized, and the optimum conditions for carrying out the polymerization have been the subject of much research work. The early processes did of course employ a high temperature of perhaps up to 300° C. and a high pressure, for example, in the region of 1200 atmospheres. These high pressure processes have been used for many years but more recently methods have become available in which owing to the use of extremely active catalysts milder polymerization conditions are possible. In general, this means that lower operating pressures are effective, and consequently the use of an expensive high pressure plant can be avoided. Moreover, the resulting polyethylenes tend to have properties which are more desirable in certain applications than the properties of conventional high pressure or thermal polyethylene; in particular the density is higher and the material is therefore more rigid. However, yields of polyethylene obtained in these processes tend to be rather low.

The present invention is directed to a catalytic polymerization process for the production of a solid polymer, including a homopolymer or a copolymer, of an ethylenically unsaturated hydrocarbon in which that catalyst comprises, in combination, an aluminum halide, an aromatic mercury compound and a salt of a Group IVB metal,* the said polymerization process being carried out in the presence of a polymerization medium that is a liquid organic halogen compound.

The process of the invention can advantageously be employed in the polymerization of a wide variety of ethylenically unsaturated hydrocarbons, although it is particularly useful in polymerizing olefins, such as ethylene and propylene as well as the butylenes, such as isobutylene, alpha-butylene, etc., and pentenes, such as alpha-pentene, 3-methyl butene-1, etc. Moreover, the ethylenically unsaturated hydrocarbon can be a diene, for example, a butadiene such as 1:3-butadiene. Aromatic members of the specified class of hydrocarbons include the vinylbenzenes, for instance styrene and alpha-methylstyrene and the ring-substituted lower alkyl derivatives thereof. More than one ethylenically unsaturated hydrocarbon can be polymerized at the same time, so that copolymerization takes place and a copolymer formed. In this way, there can, for example, be prepared an ethylene-propylene copolymer or a styrene-butadiene copolymer.

The process is particularly valuable for the production in relatively high yield of solid polyethylenes and solid polypropylenes by polymerization of ethylene and propylene respectively. For instance, polyethylenes of a wide range of physical properties can be produced, including those in the "medium density" range, density at 22° C. between 0.920 and 0.935 and the "high density" range, density at 22° C. above 0.935. The high density range includes polyethylene with a density between 0.95 and 0.98 at 22° C., for instance 0.96, that is to say a polyethylene that is very linear in character and begins to approach in some ways the properties of polymethylene. The melting point of the higher density polyethylenes is higher than that of conventional thermal polyethylene, and polyethylenes can for instance be obtained which have a vicat softening point of at least 115° C. for instance 120° C., 130° C., or even higher.

The polymerization catalyst of the invention comprises in combination an aluminum halide, an aromatic mercury compound, and a halide of a Group IVB metal.

The aluminum halide component of the catalyst mixture is preferably aluminum bromide; however, aluminum chloride is quite adequate and, although less preferred, aluminum iodide or fluoride can also be employed. A mixture of aluminum halides can be employed if desired.

The second component, the aromatic mercury compound is preferably an arylmercury compound; i.e., a mercury derivative that contains at least one aryl group in which a carbon atom of the cyclic nucleus is linked to a mercury atom. Topical of these are phenylmercurys and tolymercurys, more specifically, diphenylmercury and di(p-tolyl) mercury. However, other arylmercury compounds include dinaphthylmercury, di(o-tolyl) mercury, di(m-tolyl)-mercury, phenylmercury, p-tolylmercury, etc. The arylmercury compounds may also contain other substituents in suitable instances, as in the case of phenylmercurichloride and p-tolylmercurichloride. A mixture of more than one aromatic mercury compound can be employed with the aluminum halide.

The third component is a halide of a Group IVB metal. In particular, the tri- and tetra-halides of titanium are preferred, although titanium dihalides are also operable. Halides which are particularly attractive are those of zirconium and halfnium. Excellent results are obained when the halide is a chloride or bromide, such as titanium di-, tri- or tetra-chloride or di-, tri- or tetra-bromide. Titanium tetrachloride is eminently suitable. However, though less preferred, the corresponding fluorides or iodides of these Group IVB metals may also be employed. Mixtures of these halides may also be employed.

Liquid organic halogen compounds which can be used as the polymerization medium include halogenated aliphatic and aromatic hydrocarbons which are liquid under the polymerization conditions. For example, such compounds as alpha-chlorostyrene, dichloromethane, chlorobromomethane, tri-chloromethane (chloroform), tribromomethane, difluoromethane, iodoethane, chloroethane, dibromoethane, tetrachloroethane, pentabromoethane, chlorobromoethane, chlorodibromoethane, 1-chloropropane, 2-chloropropane, 1,1-dichloropropane, 1,3-dichloropropane, 2,2 - dichloropropane, 1,2,3 - trichloropropane, 1-bromobutane, 1,2-dichlorobutane, 1,1-dichloro-2-methylpropane, 1,5-dibromopentane, 1,5-dichloropentane, 1,3-dichloro-5-bromopentane, 1-bromohexane, 3,3-dichloro-2,3-dimethyl-butane, etc., as well as halogenated olefins such as dichloroethylene, vinyl chloride, etc., may be used in place of the trichloroethylene and tetrachloromethane

---

* Group IVB metals consist of titanium, zirconium and hafnium as defined in the Periodic Chart of the Elements at pages 56 and 57 of Lange's Handbook of Chemistry, 9th ed., published by Handbook, Inc., Sandusky, Ohio, U.S.A., 1956.

(carbon tetrachloride) employed in the examples, with equivalent results. Halogenated aliphatic hydrocarbons which are liquid under the reaction conditions employed are preferred.

The system comprising the liquid polymerization medium and the catalyst can be heterogeneous or homogeneous, but usually it will be found preferable to use a heterogeneous system. In the heterogeneous system the catalyst should be in finely-divided form.

When a heterogeneous system is employed, the catalyst can, if desired, be supported on an inert carrier, for instance, charcoal or silica gel. The three components can be each deposited on the carrier by the usual means, for instance, by impregnating the carrier with a solution of the components and then drying the carrier. Alternatively, where a polymerization medium is employed which dissolves the aluminum halide component, say aluminum bromide, but not the aromatic mercury component, then a solution of the aluminum bromide in the polymerization medium can be added to the carrier that has been impregnated with the mercury derivative.

In these circumstances despite the fact of its inherent solubility the aluminum bromide is withdrawn from solution, and becomes adsorbed on the insoluble mercury derivative on the carrier. The same phenomenon also occurs in the absence of a carrier, e.g., if a solution of aluminum bromide in the polymerization medium is added to finely-divided solid p-tolyl-mercurichloride the aluminum bromide becomes adsorbed on the particles of the insoluble mercury derivative.

The proportions in which the aluminum and mercury components are employed in the catalyst can vary broadly and excellent results can be obtained when these are equimolecular or when an excess of either the aluminum halide or the aromatic mercury compound is present. Preferably, however, an excess of the aromatic mercury compound is used; for instance the mol ratio of the aluminum halide to the aromatic mercury component can range respectively from 1:1.5 to 1:3 or even to 1:10 or 1:20. The third component, the halide of a Group IVB metal such as, for example, titanium tetrachloride, can sometimes be employed in a relatively small amount compared with the other two components; for instance the mol ratio of the aluminum halide to the Group IVB metal halide can range respectively from 1:0.1 to 1:0.5. Often, however, it is preferable to use a rather larger amount of the third component, and a very efficient catalyst is one where the mol. ratio of the aluminum halide to the Group IVB metal halide is respectively from 1:0.5 to 1:1 or even 1:2.

Owing to the activity of the catalyst employed, the process of the invention can be operated under relatively low pressures and at temperatures close to atmospheric, with all the advantages attendant on this. Thus, the polymerization can be usefully conducted between 15° and 35° C., and more advantageously between 20° and 30° C. Temperatures both lower (for instance from 5° to 15° C.) and higher (for instance up to 50° or 60° C.) can, however, be effective in certain instances. The pressure can be as low as 1 atmosphere, but is conveniently up to say at least 30 to 50 atmospheres. Often it is preferable to use pressures up to some hundreds of atmospheres, more particularly 200 atmospheres, pressures which are still relatively "low" compared with those needed in making what is known as high pressure or thermal polyethylene. Obviously, the use of pressure serves to increase the range of organic halogenated compounds which may be used as the liquid polymerization medium.

Preferably the process is operated under anhydrous conditions, since in general water will interfere with the catalyst employed. Small quantities of water can, however, be tolerated. Also, the presence of small amounts of oxygen for instance in the form of air does not appear to affect adversely the course of the polymerization.

In a typical procedure, the process of the invention is carried out by mixing the catalyst components with the polymerization medium under anhydrous conditions, and then passing in the dry ethylenically unsaturated hydrocarbon in gaseous or vapour form. Preferably the system is agitated while polymerization is taking place. Thereafter, the polymerization product can be recovered by washing the catalyst-containing mixture with a liquid that will dissolve the catalyst, for example, in suitable instances water, hydrochloric acid, methanol, ethanol, or mixtures of these materials. The polymerization product is finally filtered off and dried.

The invention is illustrated by the following examples:

*Example I*

This example describes the production of a linear polyethylene of density 0.954 by polymerization of ethylene at atmospheric pressure in a trichloroethylene polymerization medium and using a catalyst consisting of aluminum bromide, diphenylmercury and titanium tetrachloride.

Charge into a 250 cc. round-bottom flask 50 cc. of trichloroethylene, then flush air out of the system by first passing through a stream of nitrogen and then a stream of ethylene. Add to the trichloroethylene successively 1 gram of titanium tetrachloride, 1 gram of finely-divided aluminum bromide and 2 grams of finely-divided diphenylmercury. Flush the flask again with ethylene, and then fit the same to a mechanical agitator and retain connected to a source of ethylene, the latter maintained under atmospheric pressure.

During polymerization, mechanically shake the flask at 300 times per minute. Polymerization is considered to be complete when no further absorption of ethylene takes place. The temperature which is initially 20° C. rises as high as 70° C. for a short period soon after the reaction commences, because of the exothermic nature of the polymerization reaction. Over the entire polymerization period, which is about 2 hours in duration, the average reaction temperature is about 30° C. As the polymerization proceeds white flocks of solid polyethylene appear suspended in the trichloroethylene, and at the end of the polymerization period the contents of the flask are in the form of a semi-solid mass.

At the close of the polymerization period, cut off the supply of ethylene and add the contents of the flask to 500 cc. of an alcoholic hydrochloric acid solution, the latter obtained by mixing 1 volume of concentrated hydrochloric acid with 7 volumes of methanol and 2 volumes of ethanol, then boil the polymer mixture for a short time to ensure dissolution of the catalyst from the polymer. After cooling, filter off the polyethylene and dry under reduced pressure to remove residual water and organic solvents.

Purify the polyethylene by extracting the same in a Soxhlet apparatus with boiling xylene (in which the polyethylene is soluble) then recover the polyethylene from the xylene by adding to a large volume of methanol.

As a result 3.3 grams of a rigid polyethylene are obtained which has a density of 0.954 (measured at 22° C.) and a vicat softening point of 123.5° C. Examination of this product by infra-red absorption spectrum confirms it to be highly crystalline in character.

*Example II*

This example is by way of comparison to describe the production of rigid polyethylene using a cyclohexane polymerization medium and a catalyst consisting of aluminum bromide, diphenylmercury, and titanium tetrachloride and illustrate the lower conversions obtained with such a system. With the exception that 50 cc. of cyclohexane, in place of the trichloroethylene is charged into the flask initially, the entire procedure set forth in Example I is followed. Following the purification step, 1 gram of a rigid white polyethylene is obtained.

Comparisons drawn between Examples I and II make it apparent that use of the liquid halogen compound polymerization media of this invention results in a several-fold increase in conversion of monomer to polymer.

*Example III*

This example describes the production of a polystyrene using a carbon tetrachloride polymerization medium and a catalyst consisting of aluminum bromide, diphenylmercury and zirconium tetrachloride.

Charge a 500 cc. round-bottom flask with 60 cc. of carbon tetrachloride, and then flush the air out of the flask with a stream of pure nitrogen. Add successively 0.3 gram of zirconium tetrachloride, 0.5 gram of finely-divided aluminum bromide and 1.8 grams of finely-divided diphenylmercury. Nine grams of monomeric styrene are then admitted, and the flask agitated mechanically at 10° C. for 2 hours and finally for 30 minutes at 45° C.

Recover the polymer from the polymerization mass by first adding with stirring 250 cc. of an alcoholic hydrochloric acid solution obtained by mixing one volume of concentrated hydrochloric acid with 7 volumes of methanol and 2 volumes of ethanol. After separating, mix the polymer with a further 250 cc. of the alcoholic hydrochloric acid solution and boil for a short time to ensure dissolution of the remaining catalyst. Cool the mixture, then filter off the polymer and finally dry the same to remove residual water and organic solvents. As a result, 8 grams of a solid polystyrene are obtained.

*Example IV*

This example describes the production of a styrene-butadiene copolymer using a trichloroethylene polymerization medium and a catalyst that consists of aluminum bromide, di(p-tolyl)mercury and titanium tetrachloride.

Charge a 500 cc. round-bottom flask with 60 cc. of trichloroethylene, then flush the air from the flask with a stream of pure butadiene. Add successively 0.3 gram of titanium tetrachloride, 0.5 gram of finely-divided aluminum bromide and 2 grams of finely-divided di(p-tolyl)-mercury, then admit 9 grams of monomeric styrene to the flask which is fitted to a mechanical agitator and connected to a source of the butadiene maintained under a pressure of one atmosphere. During the reaction period of about 4 hours duration, maintain the flask under agitation and the temperature at about 30° C. Thereafter, recover the resulting solid styrene-butadiene copolymer from the polymerization mass and the catalyst in the manner described in the previous example.

*Example V*

This example describes the production of an ethylene-propylene copolymer using a trichloroethylene polymerization medium and a catalyst that consists of aluminum bromide, diphenyl-mercury and titanium tetrachloride.

Charge into a 500 cc. round-bottom flask 60 cc. of trichloroethylene and then flush the air from the flask with a stream of pure ethylene. Add successively 0.3 gram of titanium tetrachloride, 0.5 gram of finely-divided aluminum bromide and 1.8 grams of finely-divided diphenylmercury. Fit the flask to a mechanical agitator and connect to a source of a mixture of ethylene and propylene. The monomer mixture contains 20 mol. percent of propylene and is maintained under a pressure of one atmosphere. Reaction under the preceding conditions and a temperature of 30° C. requires 4 hours.

The resulting solid ethylene-propylene copolymer is recovered in the manner described in Example IV.

It is obvious that many variations may be made in the products and processes set forth above without departing from the spirit and scope of this invention.

Charge into a 500 cc. round-bottom flask 60 cc. of trichloroethylene and then flush the air from the flask with a stream of pure ethylene. Add successively 0.3 gram of titanium tetrachloride, 0.5 gram of finely-divided aluminum bromide and 1.8 grams of finely-divided diphenylmercury. Fit the flask to a mechanical agitator and connect to a source of a mixture of ethylene and propylene. The monomer mixture contains 20 mol. percent of propylene and is maintained under a pressure of one atmosphere. Reaction under the preceding conditions and a temperature of 30° C. requires 4 hours.

The resulting solid ethylene-propylene copolymer is recovered in the manner described in Example IV.

It is obvious that many variations may be made in the products and processes set forth above without departing from the spirit and scope of this invention.

What is claimed is:

1. A catalytic polymerization process for the production of a solid polymer product in which an ethylenically unsaturated hydrocarbon selected from the group consisting of an alkene containing 2-5 carbon atoms, butadiene, styrene, alpha-methyl styrene, and mixtures thereof, is polymerized in the presence of a catalytic mixture consisting essentially of a combination of an aluminum trihalide, an aromatic mercury compound selected from the group consisting of a phenylmercury compound, a tolylmercury compound, a naphthylmercury compound and mixtures thereof, and a halide of a Group IVB metal; and a polymerization medium which is a liquid halogenated aliphatic hydrocarbon.

2. A catalytic polymerization process for the production of a solid polymer product according to claim 1 in which the catalytic mixture consists essentially of a combination of aluminum bromide, di-(p-tolyl)mercury and a titanium halide.

3. A catalytic polymerization process for the production of a solid polymer product according to claim 1, in which the halogenated aliphatic hydrocarbon is a liquid selected from the group consisting of trichloroethylene, tetrachloroethylene and carbon tetrachloride.

4. A catalytic polymerization process for the production of a solid polymer product according to claim 1, in which the catalytic mixture consists essentially of a combination of aluminum bromide, diphenyl mercury and a titanium halide.

5. A catalytic polymerization process for the production of a solid polymer product according to claim 4, in which the titanium halide is a titanium tetrachloride.

6. A catalytic polymerization process for the production of a solid polymer product according to claim 1, in which the ethylenically unsaturated hydrocarbon is ethylene.

7. A catalytic polymerization process for the production of a solid polymer of ethylene, in which ethylene is polymerized in the presence of a catalytic mixture consisting essentially of a combination of aluminum bromide, an arylmercury compound selected from the group consisting of a phenylmercury compound, a tolylmercury compound, a naphthylmercury compound and mixtures thereof and a titanium halide, and a polymerization medium which is a liquid halogenated aliphatic hydrocarbon.

8. A catalytic polymerization process for the production of a solid polymer of ethylene according to claim 7, in which the halogenated aliphatic hydrocarbon is a liquid selected from the group consisting of trichloroethylene, tetrachloroethylene and carbon tetrachloride.

9. A catalytic polymerization process for the production of a solid polymer of ethylene according to claim 7, in which the titanium halide is titanium tetrachloride.

10. A catalytic polymerization process for the production of a solid polymer of ethylene according to claim 7, in which the polymerization is carried out at a temperature of from 15 to 60° C. and a pressure of from 1 to 200 atmospheres.

11. A catalytic polymerization process for the production of a solid polymer of ethylene according to claim 7 in which the aryl mercury compound is diphenyl mercury.

References Cited by the Examiner

UNITED STATES PATENTS 2,886,561  5/59  Reynolds et al. _____ 260—94.9
3,080,349  5/63  Clarke et al. _____ 260—88.2

JOSEPH L. SCHOFER, Primary Examiner.